United States Patent Office 3,250,674
Patented May 10, 1966

3,250,674
METHOD FOR CONTROLLING INSECTS
Don R. Baker, Pinole, Mervin E. Brokke, Richmond, and David J. Broadbent, San Jose, Calif., assignors to Stauffer Chemical Company, New York, N.Y., a corporation of Delaware
No Drawing. Filed Apr. 22, 1965, Ser. No. 450,165
6 Claims. (Cl. 167—33)

This invention relates to certain organic compounds which may be used to control insects. More specifically, the invention relates to the use of certain substituted N,N-ethylene-carbamides of the general formula

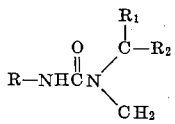

wherein R is a member selected from the group consisting of lower alkyl, cyclohexyl, phenyl and substituted phenyl, wherein said substituents are selected from the group consisting of halogen, lower alkyl, lower alkoxy and nitro, $R_1$ and $R_2$ are selected from the group consisting of hydrogen and lower alkyl, containing from 1 to 3 carbon atoms, inclusive.

The compounds of the present invention can be conveniently prepared by the reaction of the appropriate isocyanate with ethyleneimine or 2-substituted ethyleneimine in the presence of a basic catalyst, such as pyridine. Generally the reaction was conducted in the presence of an inert organic solvent, such as benzene, toluene and the like. Examples of 2-substituted ethyleneimines include compounds such as 2-methyl-, 2-ethyl-, 2,2-dimethyl-, 2,2-diethyl-, 2-propyl and 2,2-dipropyl-ethyleneimine. The appropriate isocyanate is selected such that R, as defined supra, is satisfied, as for example, phenyl isocyanate, 3-chlorophenyl isocyanate, cyclohexyl isocyanate and the like.

It has been found that the compounds herein contemplated display excellent activity in the control of insect populations. The compounds exhibit a unique property of rendering the insects sterile—that is, control or eradication becomes possible by causing sexual sterility in the insect. In some instances the degree of oviposition is greatly affected and in other cases although oviposition may take place to a limited degree the viability of the eggs is adversely affected. Here we have two modes of action of the compound, whereby propagation of the species is severely inhibited. It should be noted that the compounds herein are non-phosphorus containing aziridinyl analogs.

The compounds of the present invention may be made in accordance with the following non-limiting example.

EXAMPLE
Preparation of N,N-ethylene-N'-(4-methoxyphenyl)-carbamide

To a solution of 14.9 g. of 4-methoxyphenyl isocyanate in 75 ml. of benzene was added in one portion a solution of 7 ml. of ethylenimine and 0.5 ml. of pyridine in 25 ml. of benzene. After an initial exothermic reaction, the solution was washed with dilute hydrochloric acid and water. The layers were separated and the organic layer dried over anhydrous magnesium sulfate. The solvent was removed under reduced pressure. The title compound was obtained analytically pure, M.P. 115–116° C.

Analysis.—Calculated for $C_{10}H_{12}O_2N_2$: C, 62.48; H, 6.29. Found: C, 63.04; H, 6.98.

The following is a list of the compounds prepared according to the aforedescribed procedure. Compound numbers have been assigned to each compound and are used throughout the balance of the application.

TABLE I

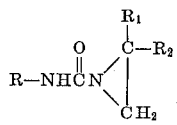

| Compound number | R | $R_1$ | $R_2$ | m.p. or $n_D^{30}$ |
|---|---|---|---|---|
| 1 | Phenyl | Hydrogen | Hydrogen | 80–81 |
| 2 | 3-chlorophenyl | do | do | 90–93 |
| 3 | Methyl | do | do | 34–40 |
| 4 | 4-methylphenyl | do | do | 95 |
| 5 | i-Propyl | do | do | (1) |
| 6 | Cyclohexyl | do | do | 75–76 |
| 7 [2] | 4-methoxyphenyl | do | do | 115–116 |
| 8 | 3-nitrophenyl | Methyl | Methyl | 110–112 |
| 9 | Ethyl | do | do | 1.4569 |

[1] Low melting solid.
[2] No. 7 prepared in the example.

As previously mentioned, the herein described compositions prepared in the above-mentioned manner are biologically active compounds which are useful and valuable in controlling various pest organisms. The compounds of this invention were tested in the following manner.

Sterilant evaluation test.—The compounds of the present invention were tested according to the instant test procedure in order to evaluate sterilant methods of insect control. The insect species Musca domestica (Linn.), the common housefly, was used in this test as a representative insect. One hundred newly emerged adult houseflies of both sexes were allowed to feed on 1% and 0.1% concentrations of the candidate compounds mixed into one teaspoon of granulated sugar. After 3 days of continuous feeding on the treated diet, the houseflies were maintained for four days on one tablespoon of untreated diet consisting of 6 parts powdered milk, 6 parts granulated sugar and one part powdered egg white.

The houseflies were given an opportunity to oviposit on the seventh day following initial exposure to the candidate compounds. The egg clusters were collected from the oviposition medium and suspended in distilled water. Approximately 100 eggs were pipetted onto a 1-inch square piece of moist black cloth. The eggs were then placed upon fresh larval media and reared through to the succeeding generations.

The compounds were evaluated on the basis of percent reduction of oviposition, percent egg viability, percent viable pupae determined by the number of adult flies emerging from the pupal stage. The criterion for choosing compounds for further evaluation is dependent upon a sufficient reduction in oviposition or low viability of the eggs and pupae and combinations thereof. Table II summarizes the chemosterilant efficiency of the compounds.

TABLE II.—CHEMOSTERILANT ACTIVITY

| Compound number | Percent reduction of oviposition | Percent viable eggs | Percent viable pupae | Percent concentration |
| --- | --- | --- | --- | --- |
| 1 | 0 | 70 | | 0.1 |
| 2 | 0 | 0 | | 1.0 |
| 3 | 50 | 75 | | 0.1 |
| 4 | 50 | 50 | 1 | 1.0 |
| 5 | 50 | 50 | 50 | 1.0 |
| 6 | 50 | 75 | 1 | 1.0 |
| 7 | 90 | 5 | 0 | 1.0 |
| 8 | 50 | 100 | 10 | 1.0 |
| 9 | 50 | 100 | 100 | 1.0 |

From these data it can be seen that these compounds are valuable chemosterilants. In practice the compounds are usually formulated with an inert adjuvant, utilizing methods well-known to those skilled in the art, thereby making them suitable for application. They may be used in the form of emulsions, non-aqueous solutions, wettable powders, vapors, dusts, dips and the like, as may be best fitted to the particular utility. The concentration of a compound of the present invention, constituting an effective amount, and the best mode of administration to a pest or its habitat may be easily determined by those skilled in the art of insect control. The disclosure is not meant to limit the action of the compounds to one particular insect species or the mode of effect thereon.

Various changes and modifications may be made without departing from the spirit and scope of the invention described herein as will be apparent to those skilled in the art to which it pertains. It is accordingly intended that the present invention shall only be limited by the scope of the appended claims.

We claim:
1. A method for controlling insects comprising applying to an insect habitat an effective amount of a compound of the formula

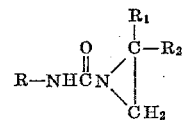

wherein R is a member selected from the group consisting of lower alkyl, cyclohexyl, phenyl and substituted phenyl, wherein said substituents are selected from the group consisting of halogen, lower alkyl, lower alkoxy and nitro, $R_1$ and $R_2$ are selected from the group consisting of hydrogen and lower alkyl, containing from 1 to 3 carbon atoms, inclusive.

2. A method for controlling insects comprising applying to an insect habitat an effective amount of the compound N,N-ethylene-N'-phenyl-carbamide.

3. A method for controlling insects comprising applying to an insect habitat an effective amount of the compound N,N-ethylene-N'-methyl-carbamide.

4. A method for controlling insects comprising applying to an insect habitat an effective amount of the compound N,N-ethylene-N'-(4-methylphenyl)-carbamide.

5. A method for controlling insects comprising applying to an insect habitat an effective amount of the compound N,N-ethylene-N'-cyclohexyl-carbamide.

6. A method for controlling insects comprising applying to an insect habitat an effective amount of the compound N,N-ethylene-N'-(3-nitrophenyl)-carbamide.

References Cited by the Examiner

UNITED STATES PATENTS 2,775,587  12/1956  Fischback et al. _____ 167—33

FOREIGN PATENTS 864,867  12/1953  Germany.
1,048,555  12/1959  Germany.

JULIAN S. LEVITT, *Primary Examiner.*

S. J. FRIEDMAN, *Assistant Examiner.*